United States Patent
Keller et al.

(10) Patent No.: US 7,350,275 B2
(45) Date of Patent: Apr. 1, 2008

(54) ATTACHMENT DEVICE

(75) Inventors: Steve C. Keller, Island Lake, IL (US); Peter D. Lewis, Bartlett, IL (US)

(73) Assignee: Illinois Tool Works Inc., Glenview, IL (US)

( * ) Notice: Subject to any disclaimer, the term of this patent is extended or adjusted under 35 U.S.C. 154(b) by 212 days.

(21) Appl. No.: 11/248,029

(22) Filed: Oct. 11, 2005

(65) Prior Publication Data

US 2006/0156519 A1 Jul. 20, 2006

Related U.S. Application Data

(60) Provisional application No. 60/645,280, filed on Jan. 18, 2005.

(51) Int. Cl.
*F16G 11/00* (2006.01)
(52) U.S. Cl. .................... 24/129 R; 24/128
(58) Field of Classification Search .............. None
See application file for complete search history.

(56) References Cited

U.S. PATENT DOCUMENTS

| | | | |
|---|---|---|---|
| 4,096,929 A | 6/1978 | Frey et al. | |
| 4,488,333 A | 12/1984 | Tracy | |
| 4,520,533 A * | 6/1985 | Kasai | 24/198 |
| 4,646,394 A * | 3/1987 | Krauss | 24/129 R |
| 4,648,159 A * | 3/1987 | Dougherty | 24/712.7 |
| 4,769,874 A * | 9/1988 | Tracy | 24/129 R |
| 5,195,218 A * | 3/1993 | Joseph et al. | 24/129 R |
| 6,170,130 B1* | 1/2001 | Hamilton et al. | 24/115 R |
| 2004/0148742 A1* | 8/2004 | Berns | 24/129 R |

FOREIGN PATENT DOCUMENTS

| | | |
|---|---|---|
| EP | 0101064 | 2/1984 |
| EP | 1182375 | 2/2002 |

* cited by examiner

*Primary Examiner*—Robert J. Sandy
(74) *Attorney, Agent, or Firm*—Mark W. Croll; Paul F. Donovan

(57) ABSTRACT

A cord attachment device is provided for sewing into a garment, bag or other structure and includes a receiver for holding an end of a cord therein. A sew tab has ribs for strengthening and is stitched into the structure. The receiver has a limited opening through which a knot of a cord cannot be pulled and a plurality of cleats on an inner surface for holding the cord.

16 Claims, 3 Drawing Sheets

ATTACHMENT DEVICE

CROSS-REFERENCE TO RELATED APPLICATIONS

The present regular U.S. patent application claims the benefits of U.S. Provisional Application Ser. No. 60/645,280 filed on Jan. 18, 2005.

FIELD OF THE INVENTION

The present invention relates generally to the attachment of cords, straps, ropes and the like to bags of various types, garments and other structures; and more specifically to devices used to complete the attachment.

BACKGROUND OF THE INVENTION

Strings, cords, ropes, straps and the like are known to be attached to backpacks, sport bags, carriers and garments of different types. Providing strings, cords, ropes, straps or the like on such structures can be for functional purposes, such as for holding other items or things in place on the structure, closing or securing an opening on the structure, or for other functional purposes. Strings, cords, ropes, straps and the like also are provided for aesthetic purposes.

It is known to attach a string, cord, rope, strap or the like by folding one end on top of itself and then stitching through the doubled over region directly into the device to which the string, chord, rope, strap or the like is to be attached. Several problems and difficulties can be experienced through direct attachments of this type. In many such assemblies, the string, cord, rope or the like is narrow, and it can be difficult to obtain and create good stitching through the narrow area. Attachment may be through one or two stitches only, and even an interlocking stitch can release if broken when only one stitch connects the string, cord, rope, strap or the like to the structure.

Another problem can occur if the bag begins to wear or fray. Wear or fraying in the region of one or two stitches holding a string, cord, rope, strap or the like can release the stitch or stitches and thereby release the string, cord, rope, strap or the like. The string, cord, rope, strap or the like, too, can wear or fray, or the braiding of a braided cord or rope can come undone. These conditions also can result in release of the one or two stitches holding the string, cord, rope, strap or the like and loss thereof from the structure.

Accordingly, it is a relatively common occurrence for a string, cord, rope, strap, or the like to be detached from a bag, garment or other structure on which it is provided. Reattaching the string, cord, rope, strap or the like in the same location by sewing can be difficult and cumbersome, and of course requires the availability of sewing materials to complete the repair or replacement.

Manufacturing difficulties can be experienced with structures having numerous strings, cords, ropes, straps or the like attached at various locations on the structure. Since the string, cord, rope, strap or the like is often attached in a seam of the structure, it may be necessary to sew the string, cord, rope, strap or the like into the seam at an early stage during the manufacturing process. Handling the items with one or more string, cord, rope, strap or the like can be difficult with loose strings, cords, ropes, straps or the like dangling from the structure. The loose ends are easily caught or snagged on equipment, and can be torn from the structure, causing damage to the structure and ruining the garment or device. Handling such items with string, cord, rope, strap or the like attached is cumbersome and inconvenient.

What is needed in the art is a device for attaching string, cord, rope, strap or the like to garments, bags and other structures which is easy to manufacture and install improving the security of the attachment and allowing final attachment of the loose string, cord, rope, strap or the like at a late stage in the manufacturing process.

SUMMARY OF THE INVENTION

The present invention provides an intermediate device that can be secured to garments, bags and other structures with multiple stitches in a strong stitching area and receives and holds strings, cords, ropes and the like which can be attached later or replaced if necessary.

In one aspect thereof, the present invention provides a cord attachment device with a sew tab configured for stitching therethrough to secure the device in a structure; a bulbous receiver connected to the sew tab, the receiver being configured for retaining a cord end therein; and a side opening from the receiver through which a cord can extend.

In another aspect thereof, the present invention provides a cord carrying structure with a cord attachment device including a sew tab configured for stitching therethrough to secure the device in the structure; a bulbous receiver connected to the sew tab, the receiver configured for retaining a cord end therein; and a side opening from the receiver through which a cord can extend. A cord is held in the receiver and extends outwardly through the side opening. A portion of the structure overlies the sew tab; and a thread is sewn through the panel and the sew tab.

In a still further aspect thereof, the present invention provides a cord attachment device with a monolithic body including a sew tab and a bulbous receiver. The receiver has a bowl-like body with an open top and a side opening. Spaced panels are connected to the body on opposite sides of the side opening. A strap spans a space between the panels substantially adjacent the open top. A plurality of ribs are provided on opposite surfaces of the sew tab, and a plurality of cleats are provided on an inner surface of the bowl-like body.

An advantage of the present invention is providing a cord attachment device that improves the security of the attachment of strings, cords, ropes, straps or the like to garments, bags and other structures.

Another advantage of the present invention is providing a cord attachment device that allows strings, cords, ropes, straps and the like on bags, garments and other structures to be replaced easily and conveniently when necessary.

Still another advantage of the present invention is providing a cord attachment device that allows strings, cords, ropes, straps and the like to be attached at later stages in the manufacturing process, thereby facilitating handling of garments, bags and other structures by facilitating attachment of the strings, cords, ropes and the like after the manufacture of the garment, bag or other structure is nearly complete.

Yet another advantage of the present invention is providing a cord attachment device with increased strength.

Other features and advantages of the invention will become apparent to those skilled in the art upon review of the following detailed description, claims and drawings in which like numerals are used to designate like features.

Figure 1:
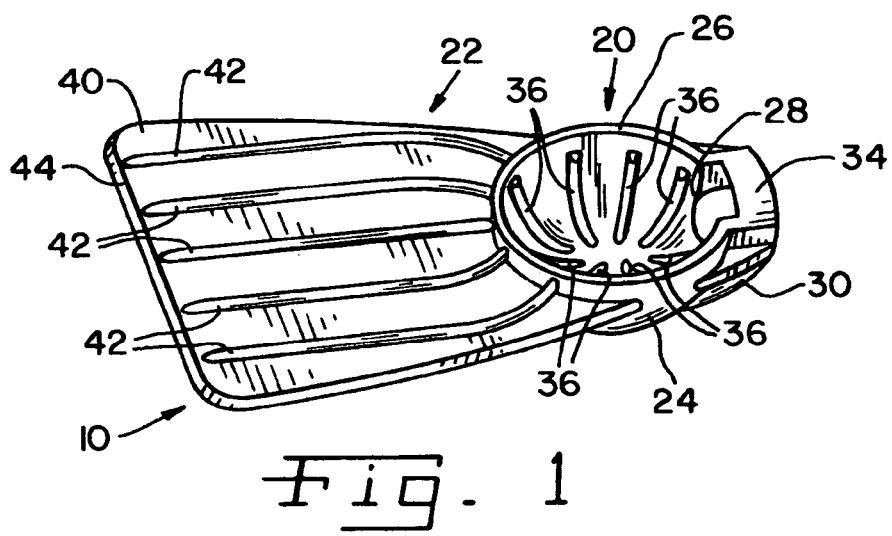
FIG. 1 is a perspective view of a cord attachment device in accordance with the present invention.
Figure 2:
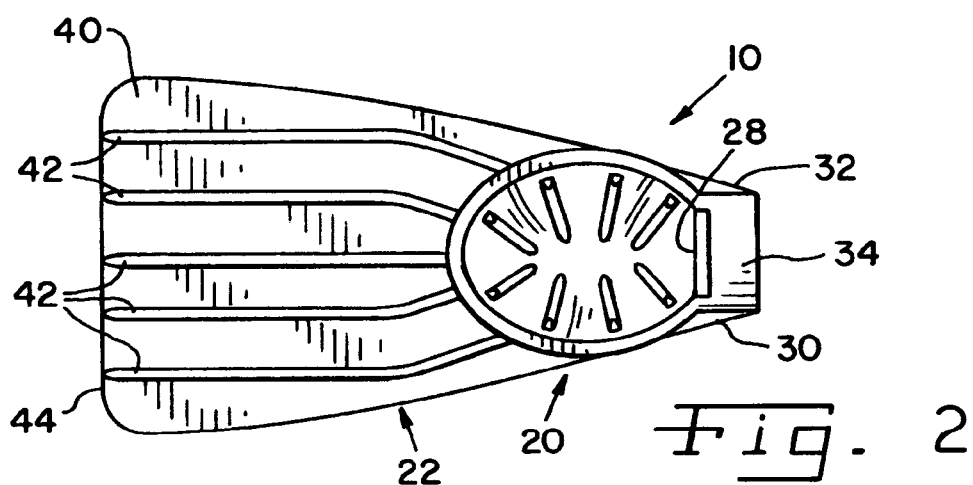
FIG. 2 is a plan view of the cord attachment device shown in FIG. 1.
Figure 3:
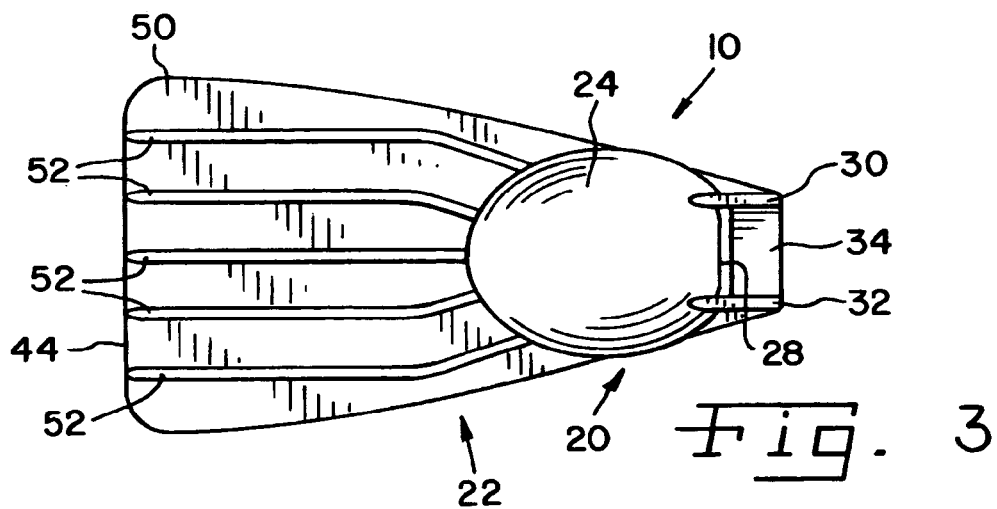
FIG. 3 is a plan view of the cord attachment device shown in FIGS. 1 and 2, showing the side opposite the side shown in FIG. 2.

Before the embodiments of the invention are explained in detail, it is to be understood that the invention is not limited in its application to the details of construction and the arrangements of the components set forth in the following description or illustrated in the drawings. The invention is capable of other embodiments and of being practiced or being carried out in various ways. Also, it is understood that the phraseology and terminology used herein are for the purpose of description and should not be regarded as limiting. The use herein of "including", "comprising" and variations thereof is meant to encompass the items listed thereafter and equivalents thereof, as well as additional items and equivalents thereof.

DETAILED DESCRIPTION OF THE PREFERRED EMBODIMENT

Referring now more specifically to the drawings and to FIG. 1 in particular, numeral 10 designates a cord attachment device in accordance with the present invention. Cord attachment device 10 functions as an intermediate connecting device between a string, cord, rope, strap or the like 12 (collectively referred to herein as a "cord 12") and a structure 14 which may be a backpack, sport bag, utility bag, garment or other structure on which a cord 12 is provided for functional or appearance purposes. Cord attachment device 10 can be provided in a variety of sizes and shapes to accommodate cords 12 of different sizes and structures 14 of different kinds.

Cord attachment device 10 is a monolithic body of plastic, such as nylon, and can be manufactured simply and inexpensively by injection molding and other techniques. Cord attachment device 10 includes a receiver 20 and a sew tab 22 connected thereto. As shown, the receiver 20 is in the shape of a bulbous receiver, but can be of different configurations. In alternative embodiments, the receiver 20 can be of other attachment devices adapted to hold or adjust a strap, cord, webbing or the like.

Receiver 20 includes a bowl-like body 24 having an open top portion 26 and a side opening 28 through which an end of cord 12 can be inserted. Panels or strengthening ribs 30, 32 are disposed on opposite sides of side opening 28 to define a channel-like entrance to receiver 20. A strap 34 spans the space between panels 30, 32 on the side of receiver 20 having open top 26. Accordingly, panels 30, 32 and strap 34 together surround cord 12, on three sides, with the edge of body 24 forming a restriction on the remaining side opposite strap 34, as can be seen most clearly in FIGS. 4 and 5.

Body 24 includes a plurality of cleats 36 disposed on an inner surface thereof. In the exemplary embodiment, eight cleats 36 are illustrated; however, more than eight cleats 36 or fewer than eight cleats 36 also can be used. Body 24 is of a size and shape to accommodate, in a relatively snug fashion, a knot 38 (FIG. 4) formed in the end of cord 12. The opening defined by panels 30, 32 and strap 34 with an edge of body 24 is sufficiently small that knot 38 can not be pulled therethrough easily.

Sew tab 22 extends from receiver 20 in substantial diametric opposition to opening 28. However, while such arrangement is shown in the exemplary embodiment, it should be understood that sew tab 22 can be provided at other angular relationships with respect to opening 28, as may be advantageous or convenient for the particular installation and application of cord attachment device 10.

Sew tab 22 is a substantially flat, paddle-like structure and may be provided in a variety of shapes and sizes for the desired installation and use. On a first side of tab 22, a first surface 40 has a plurality of ribs 42 that extend from receiver 20 to a distal end 44 of sew tab 22. Ribs 42 are elongated, raised elements on surface 40. The exemplary embodiment shows five ribs 42; however, it should be understood that more or fewer ribs 42 can be used. Further, while ribs 42 are shown extending substantially the entire length of sew tab 22 from receiver 20 to distal end 44, it should be understood that ribs 42 can be of a different length. An advantageous configuration for ribs 42 includes a rounded apex 46 on a generally triangular cross-sectional shape.

On an opposite side of sew tab 22, a second surface 50 thereof includes a plurality of ribs 52. Ribs 52 are similar to ribs 42, being elongated surface projections on surface 50 extending substantially the full distance between receiver 20 and distal end 44. However, it should be understood that ribs 52, like ribs 42, can be of a length different than that shown. The exemplary embodiment shows five ribs 52; however, it should be understood also that more or fewer ribs 52 can be used. It should further be understood that although ribs 42 and 52 are shown on both sides of sew tab 22, in alternative embodiments, only ribs 42 or 52 may be provided. An advantageous configuration for ribs 52 includes a rounded apex 54 on a generally triangular cross-sectional shape.

Figure 6:
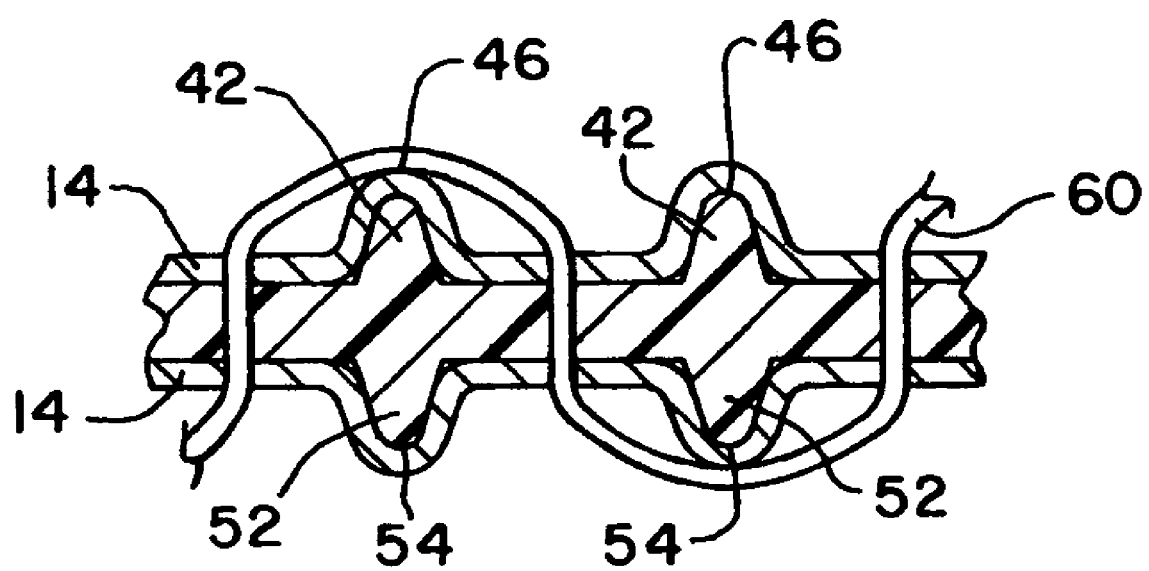
FIG. 6 is an enlarged cross-sectional view of the cord attachment device shown in FIG. 4, taken along line 6-6 of FIG. 4.

As can be seen most clearly in the cross-sectional view of FIG. 6, ribs 42 on first surface 40 are in substantial opposition to corresponding ribs 52 on second surface 50. That is, ribs 42 and 52 overlie one another on opposite sides of sew tab 22. However, ribs 42 and 52 also can be provided alternatingly on opposite sides, with each rib located centrally in the spaces defined by adjacent ribs on the opposite side of sew tab 22.

Figure 4:
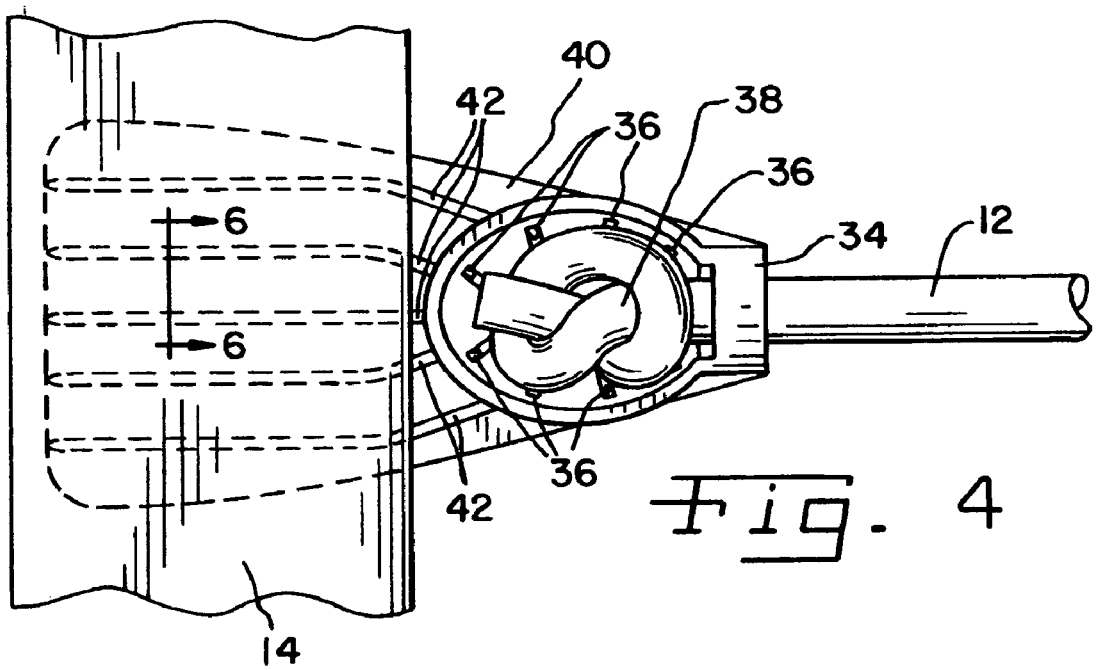
FIG. 4 is a plan view similar to that of FIG. 2, but illustrating the cord attachment device with a cord attached thereto and the device secured in a structure.
Figure 5:
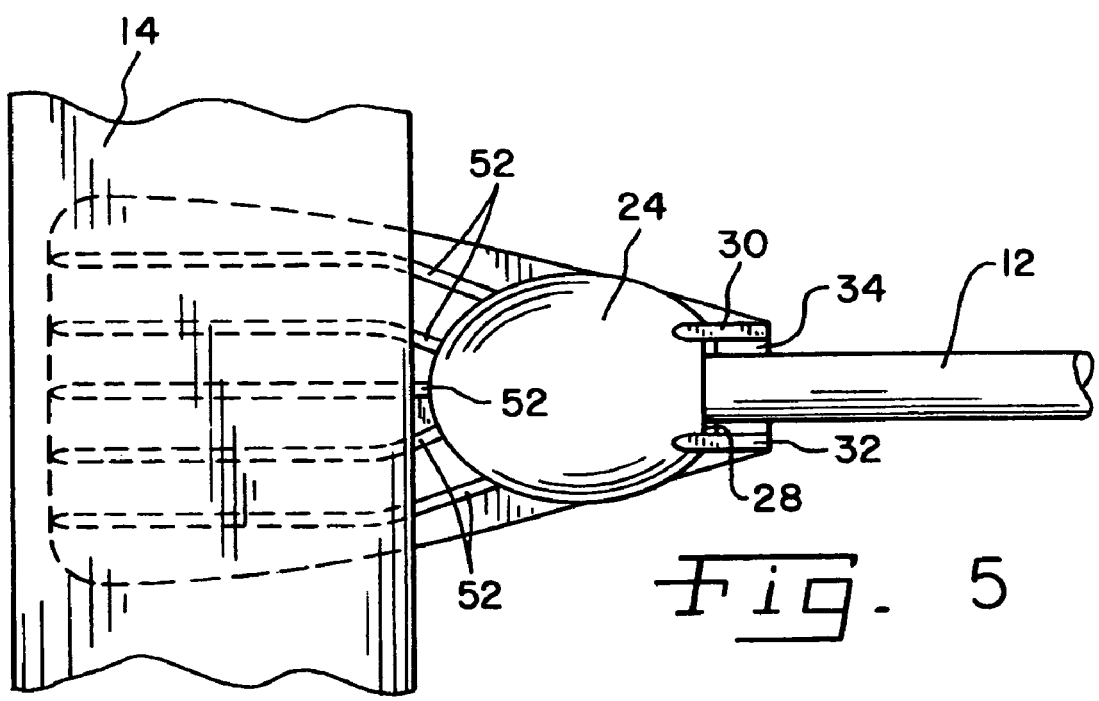
FIG. 5 is a plan view similar to that of FIG. 4, but illustrating the side opposite the side shown in FIG. 4.

FIGS. 4, 5 and 6 illustrate the manner in which cord attachment device 10 of the present invention is used and installed. As described previously, an end of cord 12 is inserted through opening 28 into receiver 20, and a knot 38 is formed in the end of cord 12. Knot 38 is pulled snug and placed in receiver 20. Knot 38 is of sufficient size so that it will not pull through side opening 28 and be released from device 10. Cleats 36 in receiver 22 embed slightly into the surface of knot 38, or into crevices formed by knot 38, to assist in securing the positioning and location of knot 38 within body 24 of receiver 20 and further inhibit knot 38 from being pulled out of receiver 20. It should be understood that, depending on what, if anything, is provided at the opposite end of cord 12, (i.e. the end not shown in FIGS. 4 and 5), knot 38 can be formed in cord 12 and the opposite end inserted through opening 28 from the inside of body 24. Cord 12 is then pulled until knot 38 settles into receiver 20.

It should be further understood that instead of using a knot 38 in the end of cord 12 to hold cord 12 in body 24, a fixture of some sort, such as a metal sphere, a ball of plastic, or other material can be clamped or adhered to the end of cord 12 and used to secure cord 12 in body 24.

To secure cord attachment device 10 to structure 14, sew tab 22 is placed against a portion or between portions of structure 14, which may be separate layers or folded areas of fabric forming structure 14. Common, known stitching techniques are used to secure sew tab 22 in structure 14. A thread 60 (FIG. 6) is passed through sew tab 22 between ribs 42, 52 and is passed over ribs 42, 52. While FIG. 6 illustrates a simple serpentine stitching pattern, it should be understood that more complex, interlocking and double stitching can be used. Accordingly, opposed ribs 42, 52 may each have portions of one or more thread 60 passing thereover. Ribs 42, 52 provide strengthening for and stiffening of sew tab 22. Further, ribs 42, 52 inhibit thread 60 from being pulled through sew tab 22. The rounded apexes 46, 54 of ribs 42, 52, respectively, and the tapered sides thereof tend to deflect a needle or other sewing implement from puncturing ribs 42, 52 and instead direct the sewing implement to the preferred puncture location between ribs 42, 52, thereby ensuring that the ribs 42 and 52 will remain intact. Thus, according to one aspect of the invention, the ribs 42 and 52 are shaped and configured in such a manner so as to deflect a needle or other sewing instrument.

Cord attachment device 10 of the present invention provides a substantially enlarged stitching area for securing the device to the bag, garment or other structure 14. Accordingly, device 10 is less likely to become detached but will instead stay affixed in position. Cord 12 can be attached to device 10 after device 10 has been secured in structure 14 and after structure otherwise has been completed substantially. Further, cord 12 can be replaced if damaged or lost in an easy, simple and inexpensive manner. Without the use of implements or sewing devices, a new cord 12 can be inserted into cord attachment device 10 and secured in place.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims.

What is claimed is:

1. A cord attachment device comprising:
   a sew tab configured for stitching therethrough to the device in a structure, said sew tab having a plurality of ribs, said ribs having rounded apexes and sloping sides;
   a receiver connected to said sew tab, said receiver configured for retaining a cord end therein, said receiver having a bulbous shape, a bowl-like body and plurality of cleats on an inner surface of said body; and
   a side opening from said receiver through which a cord can extend.

2. The cord attachment device of claim 1, said sew tab having a surface and said plurality of ribs on said surface.

3. The cord attachment device of claim 2, said sew tab having said plurality of ribs disposed on opposite surfaces thereof.

4. The cord attachment device of claim 3, said ribs on opposite sides of said sew tab being in confronting relationship.

5. The cord attachment device of claim 1, said sew tab and said receiver being a monolithic body.

6. A cord carrying structure comprising:
   a cord;
   a cord attachment device including a sew tab configured for stitching therethrough to secure said device in the structure, a receiver connected to said sew tab, said receiver configured for retaining a cord end of said cord therein, and a side opening from said receiver through which said cord can extend, said cord having a knot disposed in said receiver;
   a portion of the structure overlying said sew tab; and
   a thread sewn through said portion and said sew tab.

7. The cord carrying structure of claim 6, said sew tab having a surface adjacent said portion of the structure, and a plurality of ribs on said surface, and said thread forming stitches extending through said portion and said sew tab and overlapping at least some of said ribs.

8. The cord carrying structure of claim 7, said sew tab having ribs on opposite surfaces thereof.

9. The cord carrying structure of claim 8, said ribs on opposite sides of said sew tab being in confronting relationship.

10. The cord carrying structure of claim 8, each said rib having a rounded apex and sloping sides.

11. The cord carrying structure of claim 6, said sew tab having a plurality of ribs, said ribs having rounded apexes and sloping sides.

12. The cord carrying structure of claim 11, said receiver having a bulbous shape, a bowl-like body and a plurality of cleats on a an inner surface of said body.

13. The cord carrying structure of claim 6, said receiver having a bulbous shape, a bowl-like body and a plurality of cleats on an inner surface of said body.

14. The cord carrying structure of claim 6, said sew tab and said receiver being monolithic.

15. A cord attachment device, comprising:
   a monolithic body including a sew tab and a bulbous receiver, said receiver having a bowl-like body with an open top and a side opening;
   spaced panels connected to said body on opposite sides of said side opening;
   a strap spanning a space between said panels substantially adjacent said open top;
   a plurality of ribs on opposite surfaces of said sew tab; and
   a plurality of cleats on an inner surface of said bowl-like body.

16. The cord attachment device of claim 15, wherein said sew tab is configured for stitching therethrough to secure the device to another structure, said ribs being configured such that thread forming stitches extends through said sew tab and over said ribs, and wherein said receiver is adapted to receive and retain an end of a cord or strap like member.

* * * * *